United States Patent
Lee et al.

(10) Patent No.: US 10,218,220 B2
(45) Date of Patent: Feb. 26, 2019

(54) WIRELESS POWER TRANSMITTER AND METHOD OF CONTROLLING THE SAME

(71) Applicant: SAMSUNG ELECTRO-MECHANICS CO., LTD., Suwon-si (KR)

(72) Inventors: Tae Won Lee, Suwon-si (KR); Young Hyok Ji, Suwon-si (KR); Seung Hee Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 182 days.

(21) Appl. No.: 15/298,881

(22) Filed: Oct. 20, 2016

(65) Prior Publication Data

US 2017/0288458 A1   Oct. 5, 2017

(30) Foreign Application Priority Data

Mar. 31, 2016   (KR) .................. 10-2016-0039397

(51) Int. Cl.
*H02J 7/02* (2016.01)
*H02J 50/10* (2016.01)

(52) U.S. Cl.
CPC .............. *H02J 50/10* (2016.02); *H02J 7/025* (2013.01)

(58) Field of Classification Search
CPC ............... H02J 50/10; H02J 7/02; H02J 7/025
See application file for complete search history.

(56) References Cited

U.S. PATENT DOCUMENTS

| | | | |
|---|---|---|---|
| 2013/0082647 A1 | 4/2013 | Yoon et al. | |
| 2013/0200844 A1 | 8/2013 | Lee et al. | |
| 2016/0028248 A1* | 1/2016 | Asanuma | H02J 17/00 307/104 |

FOREIGN PATENT DOCUMENTS

| | | |
|---|---|---|
| KR | 10-2013-0035783 A | 4/2013 |
| KR | 10-2013-0090703 A | 8/2013 |
| KR | 10-2015-0059069 A | 5/2015 |

* cited by examiner

Primary Examiner — Jeffrey M Shin
(74) Attorney, Agent, or Firm — NSIP Law (57) ABSTRACT

A wireless power transmitter includes a resonator configured to transmit a detection signal; a period detector configured to detect a period of oscillation of an oscillation signal caused by remnants of the detection signal; and a controller configured to determine whether an external charging object is approaching in response to a change in the period of the oscillation signal.

12 Claims, 4 Drawing Sheets

WIRELESS POWER TRANSMITTER AND METHOD OF CONTROLLING THE SAME

CROSS-REFERENCE TO RELATED APPLICATION(S)

This application claims the benefit under 35 USC 119(a) of Korean Patent Application No. 10-2016-0039397 filed on Mar. 31, 2016 in the Korean Intellectual Property Office, the entire disclosure of which is incorporated herein by reference for all purposes.

BACKGROUND

1. Field

The following description relates to a wireless power transmitter and a method of controlling the same.

2. Description of Related Art

In accordance with the development of wireless technology, various wireless functions, ranging from the transmission of data to the transmission of power have been developed. Particularly, a wireless power charging technology capable of charging an electronic device with power, even in a non-contact state, has recently been developed.

Wireless power charging may be initiated at a time in which a wireless power transmitter recognizes the approach of a wireless power receiver. However, there may be problems in that an approach distance in which a wireless power receiver may be sensed by the wireless power transmitter may be limited.

According to related art, a wireless power transmitter transmits a detection signal, and senses a change in amplitude of the detection signal according to a change in impedance to determine the approach of a wireless power receiver.

According to related art, however, in a case in which a distance between the wireless power transmitter and the wireless power receiver is somewhat large, that is, in a case in which a variation of impedance is small, there is a problem in that it may be difficult to sense the approach of the wireless power receiver and it is also difficult to increase accuracy of sensing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a wireless power transmitter, includes a resonator configured to transmit a detection signal; a period detector configured to detect a period of oscillation of an oscillation signal caused by remnants of the detection signal; and a controller configured to determine whether an external charging object is approaching in response to a change in the period of the oscillation signal.

The resonator may be further configured to transmit the detection signal as a substantially sine shaped wave, at a substantially constant frequency, and the period detector is further configured to detect the period of the self-induced oscillation signal caused in the resonator by the detection signal after transmitting the detection signal.

The controller may be further configured to determine that the external charging object is approaching in response to another period of a self-induced oscillation signal caused by remnants of another detection signal, transmitted after the detection signal, being longer than the period of the oscillation signal caused by the detection signal.

The period detector may be further configured to detect a period of a first waveform of the oscillation signal, and determine that the external charging object is approaching in response to the period of the first waveform changing.

The period detector may be further configured to compare the oscillation signal caused by the detection signal with a reference value to generate a pulse signal substantially corresponding to the oscillation signal.

The controller may be further configured to receive the pulse signal corresponding to the oscillation signal from the period detector, and determine that the external charging object is approaching in response to a detected change in a pulse width of the pulse signal.

The period detector includes a voltage divider connected to the resonator and configured to divide a voltage level of an output signal of the resonator at a constant ratio; and a comparator configured to compare an output of the voltage divider with the reference value to generate the pulse signal.

According to another general aspect, a method of controlling a wireless power transmitter includes generating a detection signal; detecting a period of oscillation of an oscillation signal caused by remnants of the detection signal; and determining whether an external charging object is approaching in response to a change in the period of the oscillation signal.

The detection signal may be generated to be a resonance signal which is transmitted at a constant frequency through a resonator, and the detecting of the period of the oscillation signal comprises detecting the oscillation signal caused in the resonator by the detection signal, after transmitting the detection signal.

The determining of whether the external charging object is approaching may include detecting the period of the oscillation signal caused by the detection signal; detecting another period of another oscillation signal caused by another detection signal transmitted after the detection signal; and determining that the external charging object is approaching in response to the other period being longer than the period.

The detecting of the period of the oscillation signal includes detecting a period of a first waveform of the oscillation signal.

The determining of whether the external charging object is approaching may include determining that the external charging object is approaching in response to the period of the first waveform of the oscillation signal changing.

The detecting of the period of the oscillation signal may include comparing the oscillation signal with a preset reference value; outputting a voltage having a first level in response to the oscillation signal being greater than the reference value; outputting a voltage having a second level in response to the oscillation signal being equal to the reference value or less; and time-continuously outputting the voltage having the first level or the voltage having the second level to generate a pulse signal corresponding to the oscillation signal.

The determining of whether the external charging object is approaching includes determining that the external charging object is approaching in response to a detected change in a pulse width of the pulse signal.

According to another general aspect, a wireless power transmitter, includes a resonator configured to transmit a detection signal; and, a detector coupled to the resonator, the detector being configured to detect a change in an oscillation of the resonator after conclusion of provision of the detection signal to the resonator.

The oscillation of the resonator may be a self-induced oscillation.

The wireless power transmitter may further include a power supply coupled to the resonator, and wherein the detector is further configured to detect substantially concurrent inactivity between the power supply and the resonator, and changing period of the oscillation of the resonator.

The wireless power transmitter may further include a controller configured to provide the detection signal to the resonator, to initiate wireless power transfer to an external wireless power receiver via actuation of the resonator in response to the detected change in the oscillation of the resonator after conclusion of provision of the detection signal from the controller.

The controller may be further configured to indicate to the detector that provision of the detection signal to the resonator has concluded, and the detector may be further configured to detect the change in period of the oscillation in the resonator after receiving the indication from the controller that the provision of the detection signal has concluded.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" than the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic views. In the drawings, for example, due to manufacturing techniques and/or tolerances, modifications of the shape shown may be estimated. Thus, embodiments should not be construed as being limited to the particular shapes of regions shown herein, but should be understood, for example, to include a change in shape resulting from manufacturing. The following embodiments may also be configured separately or a combination thereof.

The contents described below may have a variety of configurations, but are not limited thereto.

Figure 1:
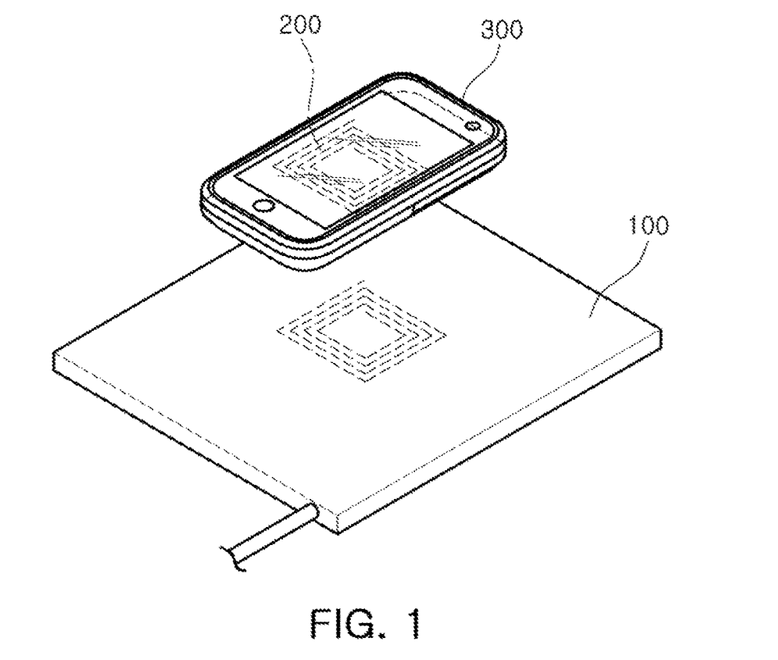
FIG. 1 is a diagram illustrating a wireless power transmitter according to an embodiment.

FIG. 1 is a diagram illustrating a wireless power transmitter according to an embodiment.

Referring to FIG. 1, a wireless power transmitter 100 periodically transmits a detection signal. When a wireless power receiver 200 is adjacent to the wireless power transmitter 100, the wireless power transmitter 100 determines a change in a detection signal to determine an approach of the wireless power receiver 200.

Thereafter, after the wireless power transmitter 100 wakes the wireless power receiver 200 up, or transmits and receives information for a wireless power charging, the wireless power transmitter 100 magnetically couples to the wireless power receiver 200 (e.g., in either or both of a magnetic resonance manner or a magnetic induction manner), to wirelessly provide power to the wireless power receiver 200.

The wireless power receiver 200 provides the received power to an electronic device 300. The wireless power receiver 200 may exist within the electronic device 300 as one component, or may be a separate device connected to the electronic device 300.

In the wireless charging technology as described above, in order to increase a charging range of a wireless charging, it is beneficial to increase a recognition distance of the wireless power transmitter 100, that is, the recognition distance in which the approach of the wireless power receiver 200 is recognized.

To this end, the wireless power transmitter 100, according to an embodiment, determines an approach of an external charging object such as the wireless power receiver 200, using a change in a period of a wave associated with the detection signal.

That is, the wireless power transmitter 100 according to an embodiment determines the approach of the external charging object such as the wireless power receiver 200, using a change in a self-induced oscillation signal caused by the detection signal.

The self-induced oscillation signal refers to an oscillation signal caused by an influence of the detection signal, after a generation of the detection signal ends. For example, in a resonator transmitting the detection signal, the oscillation signal is caused by residual energy after the generation of the detection signal, which is referred to as the self-induced oscillation signal.

The self-induced oscillation signal has a period changed by the influence of the external charging object.

Even in a case in which the change in the period of the self-induced oscillation signal is minimal, it may be easy to sense the minimal change in the period. Accordingly, even in a case in which the external charging object is distant, that is, a change in self-induced oscillation is minimal, the external charging object is still accurately sensed.

That is, according to related art, because the approach of the external charging object is detected by a magnitude of the detection signal, it has been difficult to accurately detect the approach of the external charging object due to insignificant variations in strength of the detection signal when the external charging object is relatively distant. However, as described above, because the power transmitter 100 according to an embodiment recognizes the approach of the external charging object from the period of the self-induced oscillation signal, the recognition distance is substantially increased, thereby increasing a range of a wireless charging.

Hereinafter, various embodiments of the wireless power transmitter configured to increase the recognition distance are described with reference to FIGS. 2 through 6.

Figure 2:
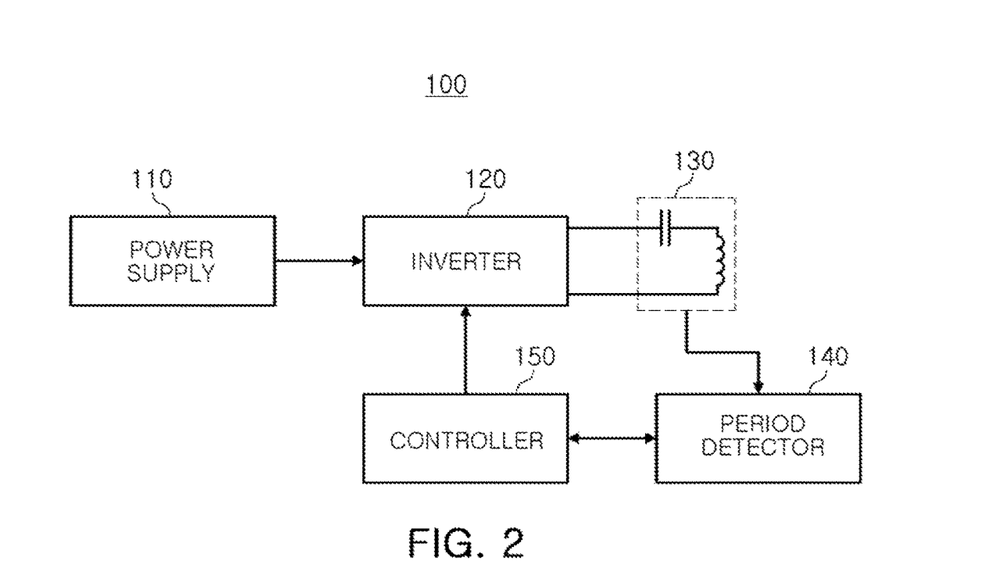
FIG. 2 is a block diagram illustrating a wireless power transmitter according to an embodiment.

FIG. 2 is a block diagram illustrating the wireless power transmitter according to an embodiment.

Referring to FIG. 2, the wireless power transmitter 100 includes an inverter 120, a resonator 130, a period detector 140, and a controller 150. According to an embodiment, the wireless power transmitter 100 further includes a power supply 110.

The power supply 110 transforms power input from the outside and outputs the transformed power. For example, the power supply 110 transforms a voltage of direct current (DC) power input from the outside. The power provided from the power supply 110 is input to the inverter 120.

The inverter 120 operates the resonator 130 using the power provided from the power supply 110. According to an embodiment, the inverter 120 includes at least one switch, and powers the resonator 130 to transmit an alternating current (AC) signal according to a switching operation.

The resonator 130 is operated according to a control of the inverter 120. As an example, the resonator 130 transmits the detection signal at a constant frequency.

When the object is approaching the wireless power transmitter 100, impedance of the resonator 130 is changed. Accordingly, the change in the impedance influences the detection signal. Specifically, after the resonator 130 transmits the detection signal, the self-induced oscillation signal caused by the detection signal is generated from the resonator 130.

The period detector 140 detects a period of the self-induced oscillation signal caused by the detection signal. The controller 150 determines whether or not the external charging object is approaching in response to a change in the period of the self-induced oscillation signal detected by the period detector 140.

The period of the self-induced oscillation signal is changed by the influence caused by the approach of the external charging object. Because the detection signal is a signal generated by the resonator 130 according to the control of the inverter 120, the detection signal is a resonance signal which is transmitted several times repetitively or is transmitted once at a constant frequency, and has a waveform substantially the shape of a sine wave as in the illustrated example of FIG. 3. Therefore, even though in the case that the external charging object is approaching, there may be little or no change in a period or a frequency of the detection signal. On the other hand, because the self-induced oscillation signal, caused by the detection signal, is greatly influenced by the external charging object, the period of the self-induced oscillation signal is changed when the external charging object is approaching. The controller 150 determines the approach of the external charging object from the change in the period of the self-induced oscillation signal detected by the period detector 140.

The controller 150 controls an operation of the inverter 120 by controlling a switch of the inverter 120.

According to an embodiment, when the switching control of the inverter 120 ends, the controller 150 informs the period detector 140 that the switching control of the inverter 120 has ended. A signal present in the resonator 130 after the period detector 140 is informed from the controller 150 that the switching control of the inverter 120 has ended is the self-induced oscillation signal. Therefore, after the period detector 140 is informed from the controller 150 that the switching control of the inverter 120 has concluded, that is, the detection signal is transmitted, the period detector 140 detects the periods of the self-induced oscillation signal caused in the resonator 130 by the detection signal.

According to an embodiment, the period detector 140 detects the period of the detection signal as well as the self-induced oscillation signal. In a case in which the periods of the detection signal and the self-induced oscillation signal detected by the period detector 140 are changed, the controller 150 determines that the external charging object is approaching.

In contrast, in a case in which the external charging object does not approach, the period of the detection signal and the period of the self-induced oscillation signal are equal, and the period input to the controller 150 is constant.

On the other hand, in a case in which the external charging object is approaching, because the period of the self-induced oscillation signal changes, the period of the self-induced oscillation signal is different from the period of the detection signal. As a result, the period input to the controller 150 is changed. As such, in a case in which the period input from the period detector 140 is changed, the controller 150 determines that the external charging object is approaching.

According to an embodiment, the period detector 140 receives the self-induced oscillation signal caused in the resonator 130 by the detection signal, and compares the self-induced oscillation signal with a reference value, thereby generating a pulse signal corresponding to the self-induced oscillation signal.

For example, the period detector 140 outputs a voltage having a first level when the self-induced oscillation signal is greater than the reference value, and outputs a voltage having a second level when the self-induced oscillation signal is equal to the reference value or less. The period detector 140 continuously outputs the output voltage having the first level or the output voltage having the second level, thereby generating the pulse signal corresponding to the self-induced oscillation signal.

The controller 150 receives the pulse signal corresponding to the self-induced oscillation signal from the period detector 140, and in a case in which a pulse width of the pulse signal is changed, the controller 150 determines that the external charging object is approaching.

According to an embodiment, in a case in which a second period of the self-induced oscillation signal caused by a second detection signal transmitted after a first detection signal is longer than a first period of the self-induced oscillation signal caused by the first detection signal, the controller 150 determines that the external charging object is approaching.

The controller 150, according to one or more embodiments, is implemented as a processor. According to an embodiment, the controller 150 further includes a memory and/or a storage device. For example, the processor includes a central processing unit (CPU), a graphic processing unit (GPU), a microprocessor, an application specific integrated circuit (ASIC), field programmable gate arrays (FPGA), and has a single or a plurality of cores. The memory is a volatile memory (e.g., a random access memory (RAM)), a non-volatile memory (e.g., a read only memory (ROM), a flash memory), or a combination thereof.

Figure 3:
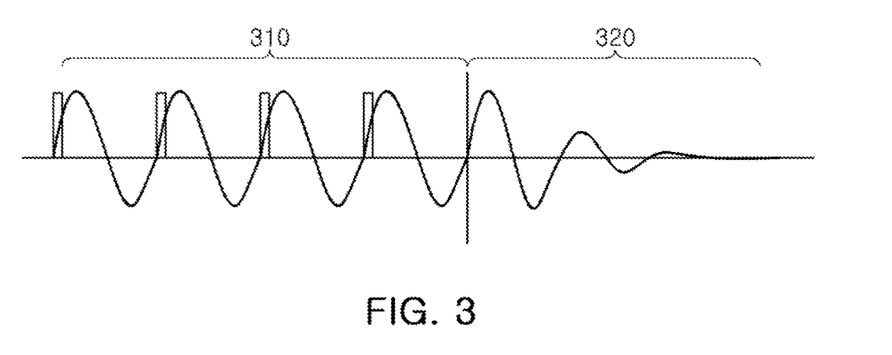
FIG. 3 is a graph illustrating an example of a self-induced oscillation signal caused in a resonator by a detection signal.

FIG. 3 is a graph illustrating a self-induced oscillation signal caused in a resonator by a detection signal.

Referring to FIG. 3, the resonator 130 transmits a detection signal 310 having a substantially constant magnitude at a substantially constant period. Although the embodiment illustrates a case in which the resonator 130 transmits the detection signal 310 repetitively several times, the detection signal 310 may also be transmitted at only one period depending on embodiments.

Once the detection signal is transmitted to the resonator 130, a self-induced oscillation signal 320 is caused in the resonator 130 by the detection signal. The self-induced oscillation signal refers to resonance oscillation by energy remaining in the resonator 130 in a state in which there is no operation of the inverter 120. As illustrated, it is seen that amplitude of the self-induced oscillation signal is gradually decreased as an oscillation having a constant frequency.

The wireless power transmitter 100 determines whether or not the external charging object is approaching, from a change in a frequency of the self-induced oscillation signal.

Figure 4:
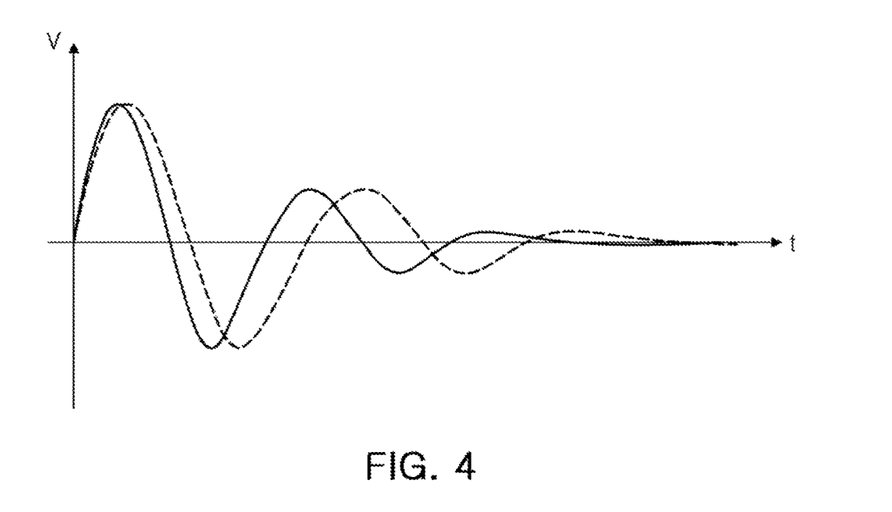
FIG. 4 is a graph illustrating a change in a self-induced oscillation signal caused by a change in impedance according to an embodiment.

FIG. 4 is a graph illustrating a change in a self-induced oscillation signal caused by a change in impedance. A solid line graph illustrated in FIG. 4 illustrates a self-induced oscillation signal when there is no external charging object, and a dotted line graph illustrates a self-induced oscillation signal when the external charging object is approaching.

When the external charging object is approaching, inductance of the resonator 130 is increased. Accordingly, it is seen that a period of the self-induced oscillation signal caused by the detection signal is increased.

That is, a resonance frequency Fr in an LC resonator may be expressed as in the following Equation 1.

$$Fr = \frac{1}{2\pi\sqrt{LC}}$$ [Equation 1]

When the external charging object is approaching, because the inductance L is increased, the resonance frequency Fr of the self-induced oscillation signal is decreased. Further, because the period is inversely proportional to the frequency, it is seen that the period of the self-induced oscillation signal is increased accordingly.

Figure 5:
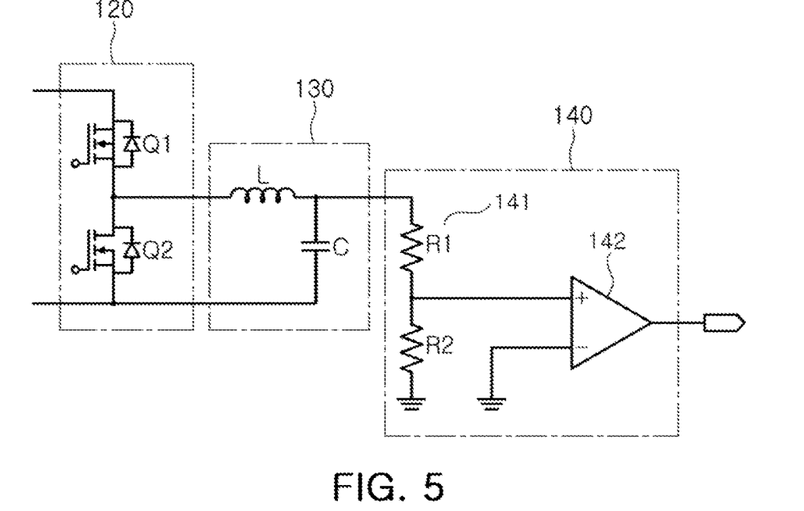
FIG. 5 is a circuit diagram illustrating an example of the wireless power transmitter illustrated in FIG. 2.

FIG. 5 is a circuit diagram illustrating an example of the wireless power transmitter illustrated in FIG. 2. FIG. 5 illustrates an example of the inverter 120, the resonator 130, and the period detector 140 of the wireless power transmitter.

Referring to FIG. 5, the inverter 120 includes a plurality of switches Q1 and Q2, and supplies power to the resonator 130 in response to a switching operation of the plurality of switches Q1 and Q2, thereby generating an AC signal.

Although the inverter 120 is illustrated as a half-bridge inverter, this merely illustrative and non-limiting. For example, various inverter circuits such as a full-bridge inverter or other suitable inverter circuits may be applied.

The resonator 130 transmits the detection signal by the switching operation of the inverter 120.

The period detector 140 is connected to the resonator 130 to receive a signal of the resonator 130.

The period detector 140 receives a self-induced oscillation signal caused in the resonator 130 by the detection signal, and compares the self-induced oscillation signal with a reference value, thereby generating a pulse signal corresponding to the self-induced oscillation signal.

According to an embodiment, the period detector 140 includes a voltage divider 141 and comparator 142. The voltage divider 141 is connected to the resonator 130, and divides a voltage level of a received output signal of the resonator 130 at a constant ratio. The comparator 142 compares an output of the voltage divider 141 with a reference value, thereby generating the pulse signal. The comparator 142 provides the generated pulse signal to the controller 150.

Figure 6:
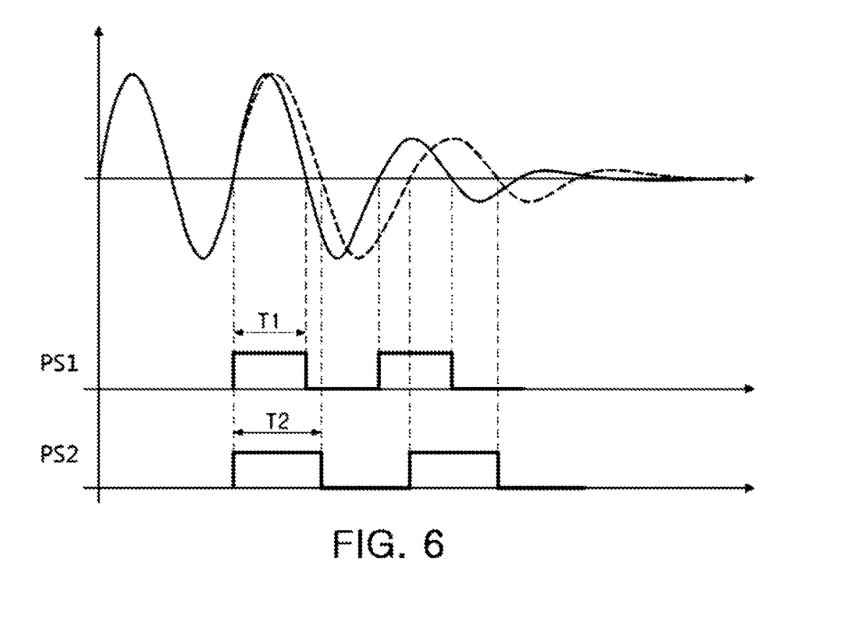
FIG. 6 is a graph illustrating an example of a pulse signal corresponding to the self-induced oscillation signal, and a change in the pulse signal caused by a change in impedance.

FIG. 6 is a graph illustrating a pulse signal corresponding to the self-induced oscillation signal, and a change in the pulse signal caused by a change in impedance. That is, the pulse signal illustrated in FIG. 6 corresponds to the output of the period detector 140 illustrated in FIG. 5.

As illustrated in FIG. 6, the self-induced oscillation signal is caused by the detection signal. A solid line illustrates a self-induced oscillation signal in a first case in which there is no external charging object, and a dotted line illustrates a self-induced oscillation signal in a second case in which the external charging object is approaching. Pulse signals PS1 and PS2 have a first level (e.g., a high level) when the self-induced oscillation signal is greater than the reference value, and have a second level (e.g., a low level) when the self-induced oscillation signal is equal to the reference value or less.

As illustrated, it may be seen that a period T2 of a second pulse PS2 of the self-induced oscillation signal of the second case in which there is the external charging object is greater than a period T1 of a first pulse PS1 of the self-induced oscillation signal of the first case in which there is no external charging object.

One reason for the difference is that when the external charging object is approaching, the resonance frequency of the self-induced oscillation signal is decreased due to an increase in the inductance of the resonator, and the period of the self-induced oscillation signal is increased accordingly.

Therefore, in a case in which a second period of the self-induced oscillation signal caused by a second detection signal transmitted after a first detection signal is longer than a first period of the self-induced oscillation signal caused by the first detection signal, the controller 150 (illustrated in FIG. 2) determines that the external charging object is approaching.

According to an embodiment, the period detector 140 (illustrated in FIG. 2) detects the period of a first waveform of the self-induced oscillation signal. In a case in which the period of the first waveform of the self-induced oscillation signal is changed, the controller 150 (illustrated in FIG. 2) determines that the external charging object is approaching. That is, as a cycle is repeated, magnitude of a wave of the self-induced oscillation signal decreases. Therefore, whether or not the external charging object is approaching may be determined using the period of the first waveform of the self-induced oscillation signal generated after the detection signal ends.

Hereinabove, the wireless power transmitter and an operation thereof according to an embodiment have been described with reference to FIGS. 1 through 6.

Hereinafter, a method of controlling a wireless power transmitter according to an embodiment is described with reference to FIG. 7. The method of controlling a wireless power transmitter may also be understood with reference to the description of the wireless power transmitter described above with reference to FIGS. 1 through 6.

Figure 7:
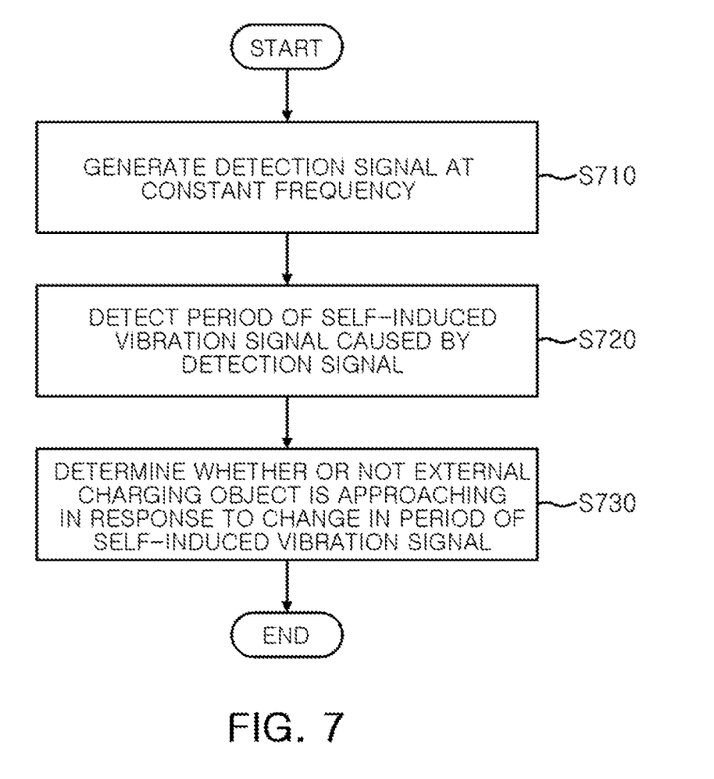
FIG. 7 is a flow chart illustrating a method of controlling a wireless power transmitter according to an embodiment.

FIG. 7 is a flow chart illustrating a method of controlling a wireless power transmitter according to an embodiment.

Referring to FIG. 7, the wireless power transmitter generates a detection signal at a constant frequency (S710).

The wireless power transmitter detects a period of a self-induced oscillation signal caused by the detection signal (S720).

The wireless power transmitter determines whether or not an external charging object is approaching in response to a change in the period of the self-induced oscillation signal (S730).

According to an embodiment, the detection signal is formed substantially in the shape of a sine wave, transmitted repetitively several times at a constant frequency through a resonator. According to an embodiment of S720, the wireless power transmitter detects the self-induced oscillation signal caused in the resonator by the detection signal, after transmitting the detection signal.

According to an embodiment of S730, the wireless power transmitter detects a first period of a first self-induced oscillation signal caused by a first detection signal. Thereafter, the wireless power transmitter detects a second period of a second self-induced oscillation signal caused by a second detection signal transmitted after the first detection signal. If the second period is longer than the first period, the wireless power transmitter determines that the external charging object is approaching.

According to an embodiment of S720, the wireless power transmitter detects a period of a first waveform of the self-induced oscillation signal. If the period of the first waveform of the self-induced oscillation signal is changed, the wireless power transmitter determines that the external charging object is approaching.

According to an embodiment of S720, the wireless power transmitter compares the self-induced oscillation signal with a preset reference value. If the self-induced oscillation signal is greater than the reference value, the wireless power transmitter outputs a voltage having a first level, and if the self-induced oscillation signal is equal to the reference value or less, the wireless power transmitter outputs a voltage having a second level. The wireless power transmitter time-continuously outputs the voltage having the first level or the voltage having the second level, thereby generating a pulse signal corresponding to the self-induced oscillation signal.

According to an embodiment of S730, if a pulse width of the pulse signal is changed, the wireless power transmitter determines that the external charging object is approaching.

As set forth above, according to the embodiment in the present disclosure, the wireless power transmitter increases performance of sensing the approach of the wireless power receiver.

The controller 150 in FIG. 2 that performs the operations described in this application is implemented by hardware components configured to perform the operations described in this application that are performed by the hardware components. Examples of hardware components that may be used to perform the operations described in this application, where appropriate, include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the FIGS. that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
   a resonator configured to transmit a detection signal;
   a period detector configured to detect a period of oscillation of an oscillation signal caused by remnants of the detection signal, and generate a pulse signal substantially corresponding to the oscillation signal; and
   a controller configured to receive the pulse signal from the period detector, and determine whether an external charging object is approaching in response to a change in the period of the oscillation signal, wherein the determining of whether the external charging object is approaching comprises determining whether the external charging object is approaching in response to a detected change in a pulse width of the pulse signal.

2. The wireless power transmitter of claim 1, wherein the resonator is further configured to transmit the detection signal as a substantially sine shaped wave, at a substantially constant frequency, and
   the period detector is further configured to detect the period of the oscillation signal after transmitting the detection signal.

3. The wireless power transmitter of claim 1, wherein the controller is further configured to determine that the external charging object is approaching in response to another period of an oscillation signal caused by remnants of another detection signal, transmitted after the detection signal, being longer than the period of the oscillation signal caused by the detection signal.

4. The wireless power transmitter of claim 1, wherein the period detector is further configured to detect a period of a first waveform of the oscillation signal, and
determine that the external charging object is approaching in response to the period of the first waveform changing.

5. The wireless power transmitter of claim 1, wherein the period detector is further configured to compare the oscillation signal with a reference value to generate the pulse signal.

6. The wireless power transmitter of claim 5, wherein the period detector comprises:
a voltage divider connected to the resonator and configured to divide a voltage level of an output signal of the resonator at a constant ratio; and
a comparator configured to compare an output of the voltage divider with the reference value to generate the pulse signal.

7. A method of controlling a wireless power transmitter, the method comprising:
generating a detection signal;
detecting a period of oscillation of an oscillation signal caused by remnants of the detection signal, wherein the detecting of the period of oscillation of the oscillation signal comprises generating a pulse signal corresponding to the oscillation signal; and
determining whether an external charging object is approaching in response to a change in the period of the oscillation signal, wherein the determining of whether the external charging object is approaching comprises determining whether the external charging object is approaching in response to a detected change in a pulse width of the pulse signal.

8. The method of claim 7, wherein the detection signal is generated to be a resonance signal which is transmitted at a constant frequency through a resonator, and
the detecting of the period of the oscillation signal comprises detecting the oscillation signal after transmitting the detection signal.

9. The method of claim 7, wherein the determining of whether the external charging object is approaching comprises:
detecting another period of another oscillation signal caused by remnants of another detection signal transmitted after the detection signal; and
determining that the external charging object is approaching in response to the other period being longer than the period.

10. The method of claim 7, wherein the detecting of the period of the oscillation signal comprises:
detecting a period of a first waveform of the oscillation signal.

11. The method of claim 10, wherein the determining of whether the external charging object is approaching comprises:
determining that the external charging object is approaching in response to the period of the first waveform of the oscillation signal changing.

12. The method of claim 7, wherein the detecting of the period of the oscillation signal comprises:
comparing the oscillation signal with a preset reference value;
outputting a voltage having a first level in response to the oscillation signal being greater than the reference value;
outputting a voltage having a second level in response to the oscillation signal being equal to the reference value or less; and
time-continuously outputting the voltage having the first level or the voltage having the second level to generate the pulse signal.

* * * * *